United States Patent
Acosta

(10) Patent No.: US 9,157,324 B2
(45) Date of Patent: Oct. 13, 2015

(54) PERIPHERAL TUNNELS PROPELLER

(76) Inventor: Jose Angel Acosta, Maracaibo (VE)

(*) Notice: Subject to any disclaimer, the term of this patent is extended or adjusted under 35 U.S.C. 154(b) by 715 days.

(21) Appl. No.: 12/838,343

(22) Filed: Jul. 16, 2010

(65) Prior Publication Data

US 2011/0020109 A1 Jan. 27, 2011

Related U.S. Application Data

(60) Provisional application No. 61/228,133, filed on Jul. 23, 2009.

(51) Int. Cl.
  *B63H 1/16* (2006.01)
  *F01D 1/34* (2006.01)
  *B63H 1/12* (2006.01)
  *F04D 29/44* (2006.01)

(52) U.S. Cl.
  CPC .. *F01D 1/34* (2013.01); *B63H 1/12* (2013.01); *F04D 29/442* (2013.01); *F04D 29/447* (2013.01); *F05D 2250/14* (2013.01); *F05D 2250/141* (2013.01); *F05D 2250/231* (2013.01); *Y02T 50/672* (2013.01)

(58) Field of Classification Search
  CPC ....... F04D 3/02; B64C 11/005; B64C 11/001; B63H 1/265; B63H 1/14; B63H 1/16
  USPC .......... 416/176, 177, 179, 189, 227 R, 227 A, 416/235; 415/71, 72, 73, 74, 75, 900, 120
  See application file for complete search history.

(56) References Cited

U.S. PATENT DOCUMENTS

| | | | | |
|---|---|---|---|---|
| 4,963 | A | * | 2/1847 | Armstrong et al. |
| 338,040 | A | * | 3/1886 | Daniels ................. 416/227 R |
| 513,536 | A | * | 1/1894 | Scowden ................ 210/150 |
| 547,210 | A | * | 10/1895 | Haussmann ............ 416/227 R |
| 1,377,472 | A | * | 5/1921 | Gibson ................... 181/263 |
| 2,276,404 | A | | 10/1939 | Lundquist |
| 3,986,704 | A | | 10/1976 | Risse |

(Continued)

FOREIGN PATENT DOCUMENTS

| | | | | |
|---|---|---|---|---|
| FR | 536766 | A | * 11/1920 | ............ B63H 1/16 |
| GB | 237853 | A | * 12/1925 | ............ B64C 11/00 |

(Continued)

OTHER PUBLICATIONS

FR0536766 English Translation. Phoenix Translations, Elgin Texas. Mar. 2015. 7 Pages.*

(Continued)

*Primary Examiner* — Richard Edgar

(57) ABSTRACT

This disclosure is related with propeller noise and cavitation abatement in applications like propulsion, ventilation, pumping or turbine systems on liquid or gas fluids working like a propellers, pumps, fans or turbines, by novel techniques that allows a stronger propellers and improves laminar flow and allow a smooth acceleration or deceleration of the liquid or gas by means of a propeller that consist on a rotating cylindrical block with one or more tunnels around it axis, said cylindrical block also may have flow separators structures at both input and output that helps to keep laminar flow of the fluid or gas with it surrounding media, having This rotating cylindrical block tunnels with either circular or irregular oval section that accelerates fluid or gas by means of both combined centrifugal and axial movement.

2 Claims, 3 Drawing Sheets

(56) References Cited

U.S. PATENT DOCUMENTS

| | | | |
|---|---|---|---|
| 4,022,689 A * | 5/1977 | Kato et al. | 210/151 |
| 4,184,946 A * | 1/1980 | Kato | 210/615 |
| 5,573,372 A * | 11/1996 | Badger | 416/93 R |
| 5,611,409 A * | 3/1997 | Arseneau | 181/228 |
| 5,890,875 A * | 4/1999 | Silvano | 416/227 R |
| 6,606,854 B1 * | 8/2003 | Siefker et al. | 60/262 |
| 6,736,600 B1 * | 5/2004 | Bannasch | 416/129 |
| 6,751,945 B1 | 6/2004 | Knight | |
| 7,896,645 B2 | 3/2011 | Loving | |
| 2005/0109030 A1 * | 5/2005 | Manolis et al. | 60/641.8 |
| 2007/0041823 A1 * | 2/2007 | Miller | 415/4.1 |
| 2009/0214338 A1 * | 8/2009 | Werle et al. | 415/220 |

FOREIGN PATENT DOCUMENTS

| | | | |
|---|---|---|---|
| GB | 372134 A * | 5/1932 | B64C 11/00 |
| GB | 439620 A * | 12/1935 | B64C 11/00 |

OTHER PUBLICATIONS http:translation.babylon.com/french/to-english/ "frette" Accessed Aug. 12, 2015. 2 pages.* http:translation.babylon.com/french/to-english/ "entourer" Accessed Aug. 12, 2015. 2 pages.*

* cited by examiner

PERIPHERAL TUNNELS PROPELLER

CROSS-REFERENCE TO RELATED APPLICATIONS

Provisional application No. 61/228,133 Filed on Jul. 23, 2009

BACKGROUND OF THE INVENTION

1. Field of Invention

The invention disclosed herein relates to propeller improvement, particularly to noise and cavitation abatement on propellers used on marine propulsion, fluid pumps, fans, and power turbines. Noise is always undesirable collateral of machine function, is source of illness, operational restrictions, and service life shortened on devices affected by noise. It is also a security concern to deal with when discrete operation is required.

2. Discussion of the Prior Art

Propellers accelerate a fluid by impinging it against a rotating blade. Such acceleration provides the thrust to an object to which it is connected. A common cause of noise is created by the turbulence of the fluid, cavitation and the vibration of the propellers' blades. Some designs achieve lower noise by means of a hardened blade structure, or surrounding the entire propeller with a duct. Other designs also reinforce the blade structure linking all blades to a ring at the propeller perimeter. Other designs use screw-type blade propellers.

Turbulence is often caused by the blade itself. The flat shape of a blade generates parasite waves that generate turbulence. This turbulence generates noise when the fluid knocks against the blade's surface or other structures near the propeller. This fluid impact creates structural tension that when released generates sound waves. To reduce the noise caused by the structural tension, reinforcements to the propeller blade structures are introduced. Some reinforcement strategies use a greater blade section or use reinforced materials on blade structures. Others use a ring attached at the extremes of the blades surrounding the propeller (see U.S. Pat. Nos. 1,441,852; 1,518,501 and 4,684,324 and their citations).

The basic technique of laminar turbulence reduction on the blades has been to design screw blade propellers as on U.S. Pat. No. 1,518,501. The blades described therein have an open semicircular chamber, which shapes help to avoid turbulence generated by flat shapes and also helps to reduce the angular momentum perturbation on the particles.

The Inertial cavitation phenomena is caused when the fluid pressure falls below it's vapor pressure due high acceleration momentum. The cavitation causes shock waves that are a powerful noise source. Prior art systems are designed to reduce cavitation by using larger diameter propellers to move a bigger volume (and mass) of fluid at a lower acceleration. Other systems inject gas under pressure. As expected, this avoids the shock waves but introduces a new source of noise to the system due the turbulence generate by such gas (see U.S. Pat. No. 4,188,906 and its citations).

All these solutions actually improved the noise abatement on the prior art systems, but didn't deal with the root of the problem. The turbulence generated by the particle circular momentum against the blade surface. Such turbulence causes a noise whose frequency is proportional to the rotational speed of the propeller.

BRIEF SUMMARY OF THE INVENTION

The present invention is a propeller device comprising, as a first embodiment, a cylindrical block with one or more peripheral tunnels, each tunnel describing a helical tunnel around a central axis, each tunnel having cross-sections with constant circular shape along the tunnel length and in perpendicular plane to the rotation axis. Each tunnel having an input end and an output end disposed at each end face of the cylindrical block, respectively. A flow-mixing device is disposed at each input and output comprising a plurality of wedges.

To move a fluid, a device is needed to transfer movement from the [[a]] device to the fluid. On propellers, this is done by rotating the propeller. Previous prior art propellers have a flat, concave or convex shape. When the propeller moves, the propeller blades provide a force against the fluid, which is greater at the propeller extreme ends because of a higher relative speed at the extreme end of each blade. Also the fluid will have a counter-revolving movement due its own inertia. The fluid being accelerated tends to keep its momentum with respect to the surrounding environmental fluid. Such fluid momentum caused by each creates turbulence and parasite shock waves on the fluid.

The present invention in its first embodiment, achieves its goal of noise abatement by displacing the fluid into a plurality of rotating cylindrical chambers (or tunnels) each having a circular cross section. When a fluid is displaced inside said chambers, each molecule keeps its inertial momentum perpendicular to the cross-sections of the tunnels. Such inertial momentum is kept by the tunnels having circular shaped cross-sections, given that a circular shape is constant regardless the angular movement relative to the starting position thus minimizing turbulence caused by hitting against the walls of the chamber (induced perturbation of the perpendicular momentum of the fluid), an easy way to visualize this phenomena (see FIG. 3a) is to place a water filled cylinder 13 (as a glass) on a rotating table 12, and do the same on the other extreme with an cubic container 14, before wait for water to calm, then add few drops of colorant inside near the border of each container (avoiding water agitation), and then rotate the table 90 degrees and stop It, now watch, it must be shown as on FIG. 3b, the water inside the cylindrical container 13 show minimal turbulence, but on the cubic container 14 the water is turbulent, this is due the inertial perpendicular momentum was perturbed, so the fluid's molecules hits against the flat surface, when a mass of fluid is turn, each molecule tries to keep the fluid's shape and angle in opposition to the container's rotation (perpendicular momentum), if the container can't keep the shape of the fluid then the molecules hits the surface generating waves this creates parasite flows from angular movement. When using a cylinder as fluid container to move a fluid in spiral movement, this agitation of the perpendicular momentum is avoided due the circular shape of the container is continuous at any rotation angles, so the fluid inertial perpendicular momentum's is kept with minimal turbulence.

DETAILED DESCRIPTION OF THE INVENTION

Figure 1A:
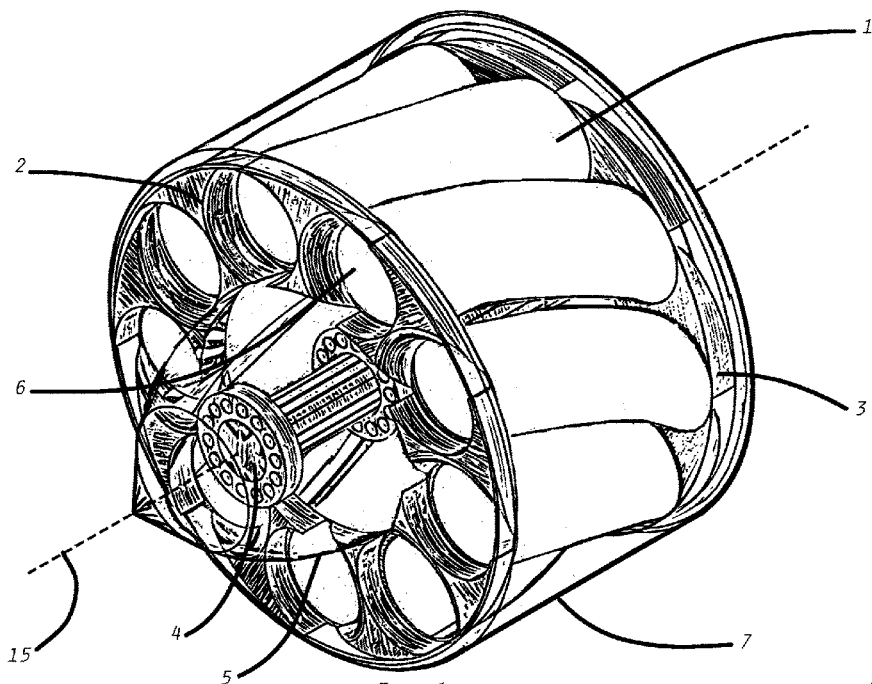
FIG. 1a is a perspective view of a Quiet Propeller of the present invention.
Figure 1B:
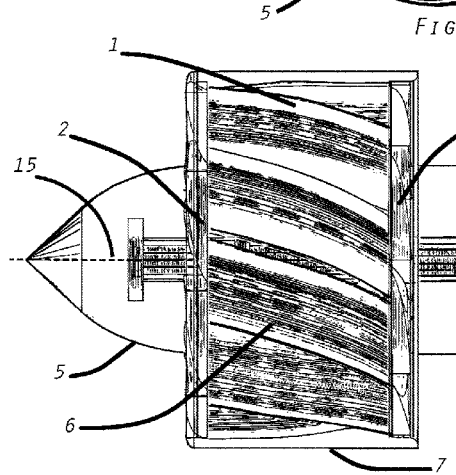
FIG. 1b is a side view of a Quiet Propeller of the present invention.
Figure 1C:
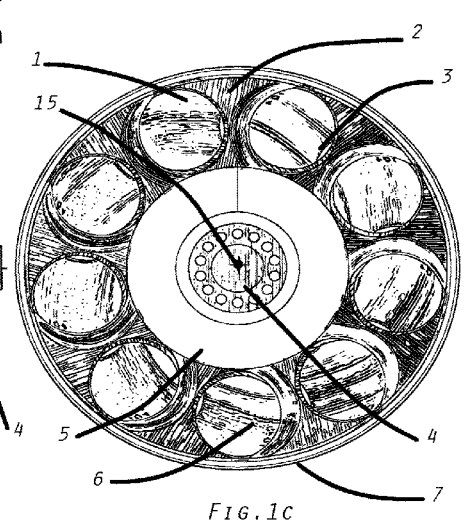
FIG. 1c is a top view of a Quiet Propeller of the present invention.

Referring now to the drawings in more detail, in FIG. 1a to FIG. 1c there is shown a cylindrical block 7 having, in its preferred embodiment, multiple peripheral holes as spiraling tunnels with inlet and outlet ends. An inner shaft 4 provides rotation guide and torque to spin the cylindrical block. Fluid guide structures 2, 3 are located at each end. The cylindrical structure further includes a conical or spherical structure 5 mounted to the outlet end.

In more detail, still referring to the invention of FIG. 1a to FIG. 1c, tunnels 1 are aligned at the same radius for a single row of tunnels or at various radii for multiple rows of tunnels. Each tunnel has a virtual center axis that describes a spiral extending from the inlet end to the outlet end. Each spiral, in the preferred embodiment, may only reach a fraction of the turn at which point the center radius may vary as the tunnel reaches the output side.

Depending on the fluid viscosity and the final speed of the propeller, the shape of each tunnel section may vary on radius, shape and central axis.

Operation

The invention achieves its goal to accelerate a fluid (liquid or gas) by spinning it inside a camber (tunnel 1) driven by shaft 4 and by both combined centrifugal and axial movement it accelerates the mass of fluid from the input end to the output end. The tunnels have the particularity that each section matches the circular momentum of the molecules, avoiding parasite sound waves due to wall collision, and thus keeping Reynolds numbers at laminar flow levels. The input and output structures 2 and 3, provide paths for input and output of the fluids through the tunnels 1 and blend smoothly with the environment. The physical structure of the cylindrical block is inherently so strong that material stress just can't make sound waves or such waves are at elevated frequency easily attenuated by the environment. Other elements such as the conical structure 5 help to keeps the fluid at laminar flow conditions.

The invention size depends on specific applications. The cylindrical block 7 maybe as small as 2 millimeters or less and as big as 50 meters or more limited only by the fabrication process. The longitudinal proportion depends on the length of tunnels 1 required to accelerate the fluid just below the cavitation inertial limit. The number of tunnels 1, in the preferred embodiment, are nine in a single row not being limited to these numbers and maybe one or more tunnels, distributed on one or more tunnel rows.

Although the embodiments shown include all features, the applicant specifically contemplate that features 4 and 5 disclosed herein may be used together or in combination with any other feature on any embodiment of the invention. It is also contemplated that any of the cited features may be specifically excluded from any embodiment of an invention.

Construction

The construction details of the invention as shown in FIG. 1a to FIG. 1c are the cylindrical block 7 could be made from fiber glass reinforced composites, metal alloy, ceramics, reinforced concrete, and any material suitable for fabrication of molded pieces. The shaft 4 could be made of the same material of the cylindrical block 7 or from higher strength materials such as steel. If made from a different material, the cylindrical block 7 must be molded around a previously machined shaft 4. The input and output structures 2 and 3 maybe made from the same material the cylindrical block 7. Conical structure 5 is made from the same material as the cylindrical block 7. In the preferred embodiment, the cylindrical block 7 and the intake and exhaust structures 2 and 3 and the conical structure 5 all are molded together.

Figure 2:
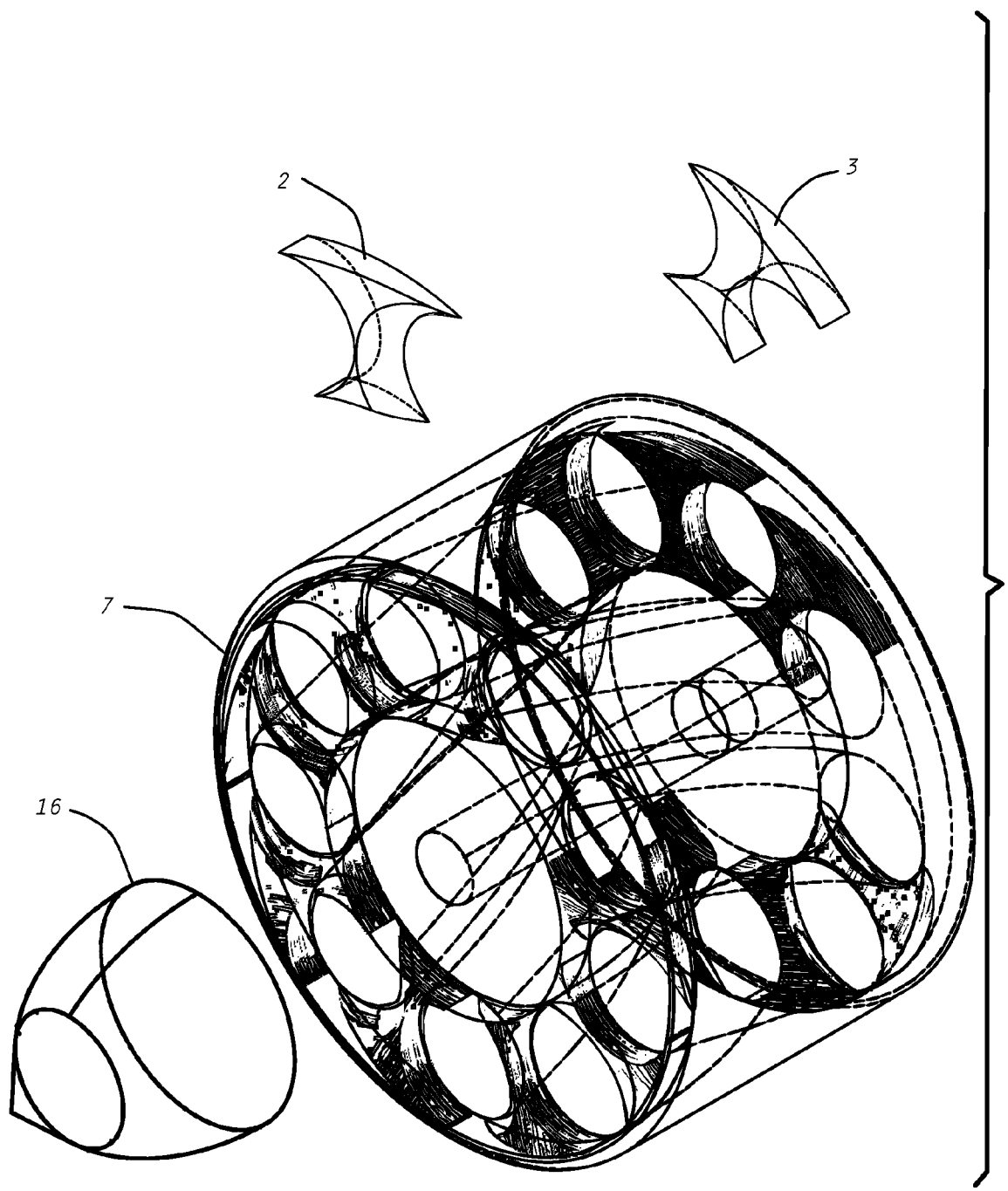
FIG. 2 is a perspective exploded view of a Quiet Propeller of the present invention.
Figure 3A:
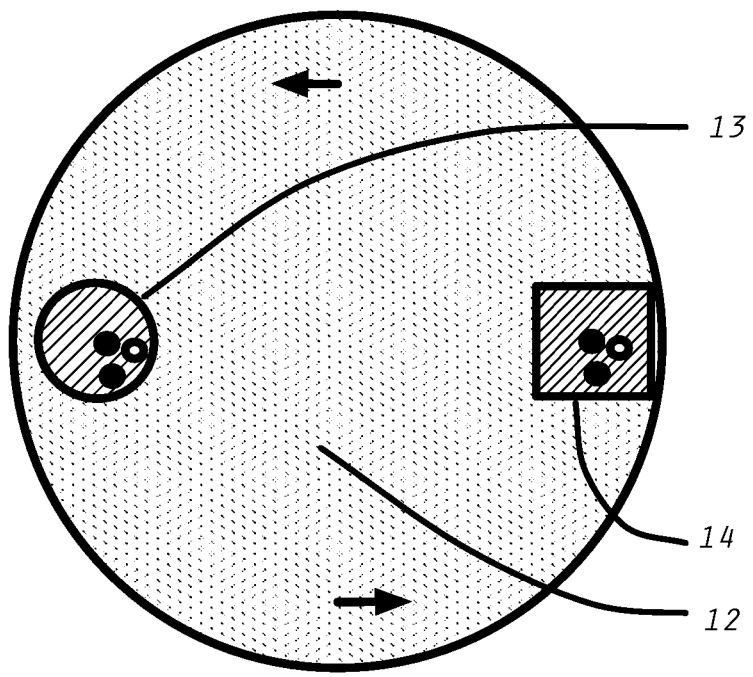
FIG. 3a is an illustration that shows how to simulate the propeller anti-turbulence principle.
Figure 3B:
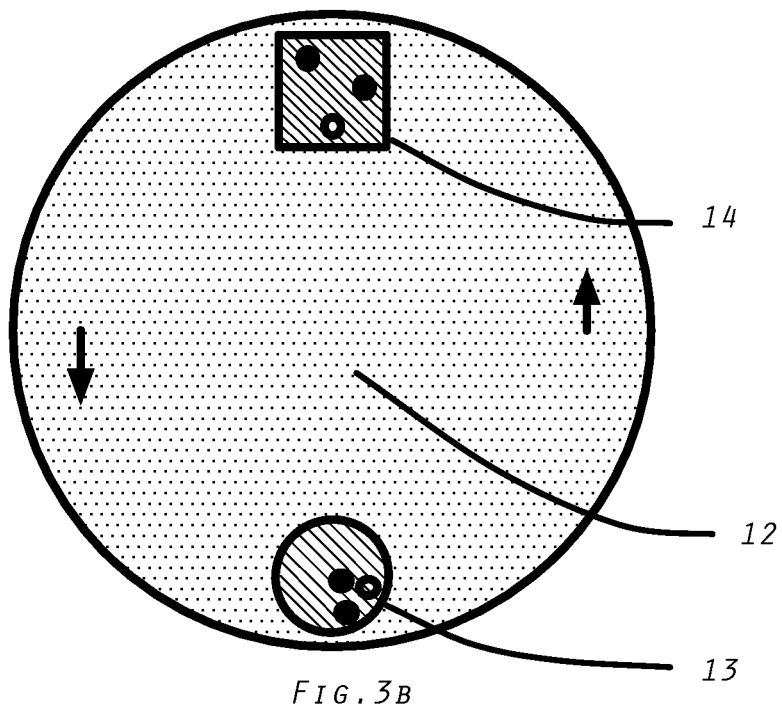
FIG. 3b is an illustration that shows how to simulate the propeller anti-turbulence principle.

FIG. 2 show the alternate build shows an alternative embodiment built from individual parts. In this embodiment, the cylindrical block 7 and the intake and exhaust structures 2 and 3 all are molded individually and joint together by means of adhesives, welding or bolts or any other joint technique.

Each tunnel 1 path (central radius) is defined in the Cartesian coordinates system using the following formulas: $x(t)=u.\sin(t.k1)$; $y(t)=u.\cos(t.k1)$; $z(t)=t.k2$; where (t) is a magnitude that represent the propeller's chords length (assigned to Z order), (k1) and (k2) are arbitrary constants multiple of Pi, (u) is the spiral expansion factor, maybe a constant or the result of another arbitrary equation with (t) as the coefficient. The tunnel radius perimeter is defined by the following formula using the Cartesian system: $x(r)=a.\sin(r)$; $y(r)=b.\cos(r)$; where (a) and (b) are a constant or maybe the result of another arbitrary equation with (r) as coefficient representing the radius. This formula applies to a single tunnel. Embodiments with multiple tunnels must derive its path formula from this formula.

The advantages of the present invention include, without limitation: Quieter operation, very strong structure on a wide variety of materials not suitable on other designs. The present invention is environmentally friendly minimizing injuries to humans or animals in the surrounding environment from by presenting continuous surfaces on both the exterior structure and interior tunnels. Also, the modulating torque of this propeller maybe used to mimic the noise of other devices to the disguise of the machine's natural sounds.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A propeller comprising
   a right perfect circular cylindrical block spinning around a central rotational axis,
   said cylindrical block having a plurality of holes as helical tunnels surrounding the rotational axis,
   each of the holes having inlet and outlet at each end face of the cylindrical block, respectively, wherein each end face of the cylindrical block is disposed at each end of the cylindrical block,
   said holes having cross-sections with perfect circular shape along the tunnel length,
   and said perfect circular shape lying constantly in perfect perpendicular plane to the rotational axis along all the tunnel extent
   whereby the cylindrical block rotation induces minimal turbulence on the perpendicular momentum of the fluid inside each respective hole thus avoiding collateral noise and delaying the cavitation phenomena.

2. A propeller comprising:
a cylindrical block spinning around a central rotational axis, said cylindrical block having a plurality of holes as helical tunnels surrounding the rotational axis,
each of the holes having inlet and outlet at each end face of the cylindrical block, respectively, wherein each end face of the cylindrical block is disposed at each end of the cylindrical block,
said holes having variable cross-sections,
said cross-sections having a perfect circular shape, and
said perfect circular shape lying constantly in perfect perpendicular plane to the rotational axis along all the tunnel extent,
whereby the cylindrical block rotation induces minimal turbulence on the perpendicular momentum of the fluid inside each respective hole thus avoiding collateral noise and delaying the cavitation phenomena.

* * * * *